US012724109B2

(12) United States Patent
Yang et al.

(10) Patent No.: US 12,724,109 B2
(45) Date of Patent: Sep. 1, 2026

(54) METHOD OF, AN ELECTRONIC SENSING DEVICE AND A SYSTEM FOR PROCESSING AN INTERFERENCE DETECTED BY A FIRST ELECTRONIC SENSING DEVICE

(71) Applicant: SIGNIFY HOLDING B.V., Eindhoven (NL)

(72) Inventors: Chun Yang, Shanghai (CN); Jialong Qiu, Shanghai (CN); Zhiquan Chen, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 285 days.

(21) Appl. No.: 18/272,819

(22) PCT Filed: Jan. 18, 2022

(86) PCT No.: PCT/EP2022/051009
§ 371 (c)(1),
(2) Date: Jul. 18, 2023

(87) PCT Pub. No.: WO2022/157146
PCT Pub. Date: Jul. 28, 2022

(65) Prior Publication Data

US 2024/0085520 A1 Mar. 14, 2024

(30) Foreign Application Priority Data

Jan. 20, 2021 (WO) ................ PCT/CN2021/072930
Feb. 26, 2021 (EP) .................................... 21159545

(51) Int. Cl.
*G01S 7/02* (2006.01)
*G01S 7/35* (2006.01)
*G01S 13/87* (2006.01)

(52) U.S. Cl.
CPC ............ *G01S 7/0232* (2021.05); *G01S 7/356* (2021.05); *G01S 13/87* (2013.01)

(58) Field of Classification Search
CPC .......... G01S 13/87; G01S 7/003; G01S 7/023; G01S 7/0232; G01S 7/356; H05B 47/115
See application file for complete search history.

(56) References Cited

U.S. PATENT DOCUMENTS

2005/0242985 A1 11/2005 Ponsford et al.
2014/0269606 A1* 9/2014 Abdelmonem ..... H04W 64/006 370/330

(Continued)

FOREIGN PATENT DOCUMENTS

CN 102597936 A 7/2012
CN 107765223 A 3/2018

(Continued)

OTHER PUBLICATIONS

"How To Eliminate Cross Talk When Multiple UM18 and UM30 Ultrasonic Sensors Are Used Together," https://sickusablog.com/aboid-crosstalk-when-connecting-ultrasonic-sensors, Dated Jun. 2016, Last Viewed Jul. 7, 2023 (7 Pages).

(Continued)

*Primary Examiner* — Timothy X Pham

(57) ABSTRACT

A method of processing an interference detected by a first microwave sensor is disclosed. The method comprising the steps of: receiving, by a second microwave sensor, from the first microwave sensor a message comprising a signal feature profile representing the interference detected by the first microwave sensor; matching, by the second microwave sensor, the signal feature profile comprised in the received message with a stored feature profile, the stored feature profile obtained by the second microwave sensor from its own received signal, and determining, by the second microwave sensor, that the interference detected by the first (Continued)

microwave sensor is caused by the second microwave sensor, if the signal feature profile matches the stored feature profile.

15 Claims, 5 Drawing Sheets

(56) References Cited

U.S. PATENT DOCUMENTS

| | | | | |
|---|---|---|---|---|
| 2015/0331093 | A1* | 11/2015 | Pandharipande | G01S 7/524<br>367/93 |
| 2016/0077197 | A1 | 3/2016 | Vangeel et al. | |
| 2017/0086202 | A1* | 3/2017 | Chen | H04W 72/541 |
| 2020/0088838 | A1* | 3/2020 | Melzer | G01S 7/352 |

FOREIGN PATENT DOCUMENTS

| | | | |
|---|---|---|---|
| EP | 3591423 | A1 | 1/2020 |
| KR | 101348548 | B1 | 1/2014 |
| WO | 2021013514 | A1 | 1/2021 |

OTHER PUBLICATIONS

National Instruments, "Understanding Ffts and Windowing," https://download.ni.com/evaluation/pxi/understanding%20ffts%20and%20windowing.pdf, Last Viewed Jul. 7, 2023 (15 Pages).

* cited by examiner

METHOD OF, AN ELECTRONIC SENSING DEVICE AND A SYSTEM FOR PROCESSING AN INTERFERENCE DETECTED BY A FIRST ELECTRONIC SENSING DEVICE

CROSS-REFERENCE TO PRIOR APPLICATIONS

This application is the U.S. National Phase application under 35 U.S.C. § 371 of International Application No. PCT/EP2022/051009, filed on Jan. 18, 2022, which claims the benefit of International Application No. PCT/CN2021/072930, filed on Jan. 20, 2021 and European Patent Application No. 21159545.9, filed on Feb. 26, 2021. These applications are hereby incorporated by reference herein.

TECHNICAL FIELD

The present disclosure generally relates to the field of sensing technology and, more specifically, to a method of, an electronic sensing device and a system for processing an interference detected by a first electronic sensing device.

BACKGROUND

Sensing technology is a technology that uses sensors to acquire information by detecting physical, chemical, or biological property quantities and convert them into readable signals. Currently, sensors are available to detect a wide variety of real-world properties from motion and distance to heat to pressure.

One type of sensors using an active measurement method give a signal to a target or object to be measured or detected and detect reflection from the target. Such sensors require a source of energy for giving or transmitting a signal such as light, electromagnetic wave, radiation, and sound to the measurement target or object, and receive its reflection, transmission, and absorption, and detect the feature quantity of the target or object.

EP3591423A1 is about adding a path of capacitor to microwave sensor to detect press only to avoid mis-trigger of microwave sensor caused by vibration. The microwave sensor's trigger is true, if the microwave sensor path is triggered and there is no detection on the press detection capacitor; otherwise the microwave sensor's trigger is most likely a false trigger caused by vibration, if there is press detection.

WO2021013514A1 is about processing of sensor signal data. If a feature profile of the captured sensor signal data matches at least one of the set of predetermined feature profiles, and processing of sensor signal data is performed (14) by the sensor device locally. If the generated feature profile does not match at least one of the set of predetermined feature profiles, processing of sensor signal data is perform remotely, e.g. by a cloud server.

US2016077197A1 discloses a signal processing module comprising a control logic for detecting disturbance having potential to compromise a sensing, wherein the signal processing module is configured to detect this disturbance by listening for an unwanted signal in a region of the spectrum outside the frequency band of the echoes, and to adapt the sensing in dependence on the detected disturbance.

US20153310193A1 discloses an apparatus for use in one of a plurality of sensors each having a respective transmitter which transmits pulses for sensing, a respective clock which controls timing of the pulses transmitted from the respective transmitter, and a respective receiver which receives echoed instances of the pulses. It aims at adjusting the timing of the pulses from the respective transmitter.

As an example, motion detection sensing devices, such as microwave sensors, also known as radar sensors, are widely used to detect motion or presence of human or other objects. The operation of radar sensors is based on the principle of Doppler radar. Specifically, a continuous wave of microwave radiation is emitted by a transmitter of a radar sensor, and phase shifts in reflected microwaves due to motion of an object toward or away from a receiver of the radar sensor result in a heterodyne signal at a low frequency.

Recently, lighting fixtures are often integrated with microwave sensors for enabling better lighting experience for users such as drivers. One issue that arises with integrating microwave sensors with lighting fixtures is the so-called 'cross-talk' between microwave sensors.

The 'cross-talk' is a type of interference between electronic sensing devices and can be simply understood as transmission, Tx, radiation from one electronic sensing device, such as a microwave sensor, being picked up and processed, as a fake Doppler effect, by a receiver, Rx, of another electronic sensing device, such as a further microwave sensor. The cross-talk would always be present if operating frequencies of two microwave sensors $f_{tx1}$ and $f_{tx2}$ are different, that is $f_{tx1}-f_{tx2}\neq 0$, which is almost true to all of existing microwave sensors.

An intermediate frequency, IF, signal, as the output signal from the microwave sensor, is normally processed via a band-pass-filter, BPF, together with an operational amplifier, OP. If the difference between the operating frequencies of two microwave sensors $f_{tx1}-f_{tx2}$ drops into the BPF passing band, the cross-talk would be presented within the IF output signal of the sensors as a visible interference leading to false positive.

Currently, two approaches are normally used to minimize the impact caused by the cross-talk between microwave sensors. With the first approach, the Tx frequencies of the microwave sensors are set in a big spread, which helps to keep enough piece to piece and batch to batch bandwidth margin such that the operating frequency difference is beyond the BPF passing band. This method can only be done manually in the factory, which entails high manufacturing value added, MVA, costs.

With the second approach, the microwave sensors are kept far enough from each other such that the impact of cross-talk can be minimized. Sensor manufacturers normally will add warning into their installation guide to ask the end users to keep sensors at least a few meters away from each other.

This second method is simply a work-around solution which does not really solve the cross-talk itself but minimizes the impact by compromising the application coverage. In real life applications, it often requires two or even more microwave sensors to be installed in a close proximity, which cannot be remedied by the work-around approach.

Accordingly, there is a need for a novel method that can effectively process the interference or cross-talk between electronic sensing devices such as microwave sensors such that the frequency band can be used efficiently while the electronic sensing devices can be arranged in proximity to each other as needed.

SUMMARY

In a first aspect of the present disclosure, there is provided a method of processing an interference detected by a first electronic sensing device, the method comprising the steps of:

receiving, by a second electronic sensing device, from the first electronic sensing device a message comprising a signal feature profile representing a suspected interference detected by the first electronic sensing device in its received signal;

matching, by the second electronic sensing device, the signal feature profile comprised in the received message with a stored feature profile, the stored feature profile obtained by the second electronic sensing device from its own received signal within a predetermined time period before receiving the signal feature profile, and determining, by the second electronic sensing device, that the interference to the first electronic sensing device is caused by the second electronic sensing device, if the signal feature profile matches the stored feature profile.

The inventors' insight regarding cross-talk phenomenon based on theoretical and experimental study shows that cross-talk interferences detected by two electronic sensing devices interfering each other, such as microwave sensors, exhibit a similar frequency pattern in time sequence, which represents the variation of the operating frequency difference $\Delta f$ between the two electronic sensing devices.

The above insight is used advantageously in the present disclosure to process a suspected interference or cross-talk detected by one electronic sensing device, such that a source of the suspected cross-talk, that is a second electronic sensing device causing the cross-talk, can be accurately and efficiently decided, and the cross-talk can then be effectively eliminated.

According to the solution of the present disclosure, the first electronic sensing device experiencing interference will transmit a message comprising a signal feature profile which represents the suspected interference that it detects in its received signal. The message comprising the signal feature profile is received by a second or further electronic sensing device.

The second electronic sensing device will then try to match the signal feature profile in the received message to a feature profile stored by itself. Such a stored feature profile represents a signal, possible also an interference, that the second electronic sensing device detects in its received signal during a time period just before it receives the signal feature profile from the first electronic sensing device.

When the received signal feature profiles matches the stored feature profile, it can be determined that the second electronic sensing device is the source of the interference to the first electronic sensing device.

The above solution is straightforward and easy to implement and can accurately identify the source of interference experienced by the electronic sensing devices. This is due to that the source of interference can only be determined when a match between the received signal feature profile and the stored feature profile exists. The mutual confirmation of the cross-talk between the first and second electronic sensing devices prevents any possible false positive.

When the suspected cross-talk signal feature profile comes from a real motion signal, the second electronic sensing device receiving the signal feature profile will not be able to match its stored feature profile thereto. Thus no false identification of the source of interference will be given.

In an example of the present disclosure, the signal feature profile is obtained by the first electronic sensing device by applying a transformation algorithm to its received signal, in particular, the transformation algorithm is a Fast Fourier Transform, FFT, algorithm, from which a number of consecutive FFT frames having peak energy higher than a threshold value are obtained, each FFT frame comprising a plurality of frequency components each having an energy.

The suspected interference present in the received signal of the electronic sensing device, such as an intermediate frequency, IF output of a microwave sensor, can be recognized more easily in the frequency domain than in the time domain, as the interference has a frequency pattern representing the changing of the difference between the operating frequencies of the first electronic sensing device and the second electronic sensing device causing the interference.

Therefore, a transformation algorithm may be applied to the signal received by the first electronic sensing device to obtain a frequency domain representation of the interference, such as a frequency pattern arranged in sequence based on time of generating the frequencies, which allows the interference to be identified by the first electronic sensing device more easily.

The feature profile stored by the second electronic sensing device is obtained in a similar way by applying the transformation algorithm to its received signal.

A specific example of the transformation algorithm is Fast Fourier Transform, FFT, algorithm, which is used to obtain a number of consecutive FFT frames having peak energy higher than a threshold value, each FFT frame comprising a plurality of frequency components each having an energy.

In terms of computing resource requirements, including both processing and storage capacity, FFT qualifies as a relatively simple data structure, representing useful physical information for evaluating the frequency property of the suspected interference detected by the electronic sensing device.

When a number of consecutive FFT frames obtained from FFT are found to have a peak energy in their frequency range consistently larger or higher than a threshold value, for a certain period such as two seconds for example, a suspected interference is identified.

As detailed in the following, depending on the computation and network resources available for processing the suspected interference, the signal feature profile transmitted by the first electronic sensing device may comprise the identified consecutive FFT frames having peak energy higher than a threshold value, or simply comprise a pattern or profile formed by frequencies identified from each FFT frame.

In an example of the present disclosure, the signal feature profile comprises the number of consecutive FFT frames having peak energy higher than a threshold value, the message further comprises a duration of the signal feature profile, the predetermined time period is longer than the duration of the signal feature profile, the step of matching comprises the steps of:

retrieving, by the second electronic sensing device, the number of consecutive FFT frames of the signal feature profile from the message;

forming, by the second electronic sensing device, a further profile comprising a number of frequencies each identified as a frequency component having peak energy among the frequency components of a respective FFT frame of the signal feature profile, and comparing, by the second electronic sensing device, the frequencies having peak energy with corresponding frequencies of a set of FFT frames of the stored feature profile obtained within the predetermined time period before receiving the signal feature profile via a sliding window algorithm.

In this example, the number of consecutive FFT frames having peak energy higher than a threshold value are transmitted as the signal feature profile to the second electronic sensing device.

The second electronic sensing device receiving the message comprising the signal feature profile as discussed above will first has the message decoded so as to retrieve the consecutive FFT frames from the message.

Thereafter, the FFT frames of the signal feature profile are further processed to identify frequencies with peak energy of all the consecutive FFT frames received from the first electronic sensing device.

In particular, a frequency with a peak energy, of all frequency components of each FFT frame, is selected as a representing frequency of the FFT frame. Based on frequencies selected from each FFT frame, a further profile, pattern or waveform is formed by the frequencies of the FFT frames with the strongest signal in terms of energy against the sequence number of the FFT frames.

The frequencies of the further profile and frequencies of a set of FFT frames of the feature profile obtained and stored by the second electronic sensing device are compared.

The signal feature profile is further encoded to include a duration of the signal feature profile, and optionally the device identification of the electronic sensing device, which together form the message transmitted by the first electronic sensing device.

The duration may be expressed by a time period or a number of frames of the signal feature profile. It allows the receiving second electronic sensing device to recognize a length of the received signal pattern profile, which will be used in the matching step for determining a time period, just before the time of the detection of the signal feature profile, of the stored feature profile to be matched to the received signal feature profile.

When the electronic sensing device identifies the signal feature profile from the FFT result in for example the past two seconds, it can broadcast the whole FFT frames within these two seconds via a radio frequency, RF, message. If there is no latency from the signal processing and the RF communication, the receiving second electronic sensing device can do the comparison directly.

However, in reality it takes time for the first electronic sensing device to do the signal processing to generate its FFT frames, and the RF communication also has a certain level of latency, therefore the receiving second electronic sensing device will do the FFT frames comparison within its own FFT result during a longer period, for example in the past 5 seconds, instead of 2 seconds. It can thereby ensure that all the latencies had been taken into accounts with 3 seconds margin.

The comparison is therefore done by a window sliding algorithm to find the two seconds of the stored feature profile that matches the signal feature profile.

The device identification allows the second electronic sensing device to identify the sender of the message.

In an alternative example, the signal feature profile transmitted by the first electronic sensing device comprises the number of frequencies each identified as a frequency component having peak energy among the frequency components of a respective one of the number of consecutive FFT frames. In this case, the step of matching comprises the steps of:

retrieving, by the second electronic sensing device, the signal feature profile comprising the number of frequencies from the message, and comparing, by the second electronic sensing device, the frequencies having peak energy with corresponding frequencies of a set of FFT frames of the stored feature profile obtained within the predetermined time period before receiving the signal feature profile via a sliding window algorithm.

In this example, the profile formed by frequencies with peak energy out of each FFT frames are identified at the first electronic sensing device detecting the suspected interference and transmitted as the signal feature profile to the second electronic sensing device.

This alternative example is the same as the above example, except that the processing for identifying the frequencies with peak energy is performed at the first electronic sensing device. This is especially advantageous when network resources available for transmitting information between the electronic sensing devices is limited, as the signal feature profile being transmitted is really small in terms of size.

In an example of the present disclosure, the signal feature profile matches the stored feature profile when a qualifying number of frequencies having peak energy and corresponding frequencies of the set of FFT frames of the stored feature profile are identical to each other.

In the case that only a cross-talk signal is present without any other signals such as a motion or interferences from other sources, like a LED driver or environment, the frequencies of the signal feature profile representing the suspected interference detected by the first electronic sensing device and the frequencies of the stored feature profile representing the signal detected by the second electronic sensing device will be identical, that is, there is 100% match between the corresponding frames.

In practice, in consideration of the presence of other interferences, a threshold may be defined for determining a matching. As an example, when 20 frequencies of 20 FFT frames are comprised in the signal feature (further) profile, a match may be determined when 19 of the 20 frequencies in the signal feature profile and the stored feature profile are identical.

For the above examples, it can be contemplated by those skilled in the art that the qualifying number of identical frequency components in each pair of FFT frame being compared or the qualifying number of identical frequencies of the signal feature profile and the stored feature profile may be set to different numbers, based on application dependent requirements, such as accuracy of interference reporting, available resources of the electronic sensing devices and so on.

As an example, a criterion may be that 95%, 90%, 85% or 80% of the frequencies forming the signal feature (further) profile and the stored feature profile are identical.

In an example of the present disclosure, the method further comprising the step of:

adjusting, by the second electronic sensing device, its operating frequency by a preset offset frequency such that the interference to the first electronic sensing device is eliminated.

As the second electronic sensing device has determined that itself is the source of interference to the first electronic sensing device, it can conveniently adjust its own operating frequency to offset it from the current operating frequency, which will shift the frequency difference between the second electronic sensing device and the first electronic sensing device out of the passing band of the bandpass filter of the first electronic sensing device, thereby eliminating the interference to the first electronic sensing device, also to the second electronic sensing device itself.

In an example of the present disclosure, the adjusting is performed by the second electronic sensing device under control of at least one of the second electronic sensing device itself, a central control device and an operator.

This allows more flexibility in choosing a more appropriate way for correcting the interference.

In an example of the present disclosure, the first and second electronic sensing devices comprise microwave sensors.

This method can be advantageously used by a microwave sensor and a further microwave sensor interfering or experiencing cross-talk to identify the source of the interference and thereafter eliminate the interference by adjusting the operating frequency of one of the sensors.

In a second aspect of the present disclosure, there is provided electronic sensing device, in particular a microwave sensor, for processing an interference detected by a first electronic sensing device, the electronic sensing device comprises a transceiver and a processor, wherein:

the transceiver is arranged for receiving, from the first electronic sensing device, a message comprising an signal feature profile representing a suspected interference detected by the first electronic sensing device in its received signal;

the processor comprises:

a matching module arranged for matching the signal feature profile comprised in the received message with a stored feature profile, the stored feature profile obtained by the electronic sensing device from its own received signal within a predetermined time period before receiving the signal feature profile, and a determination module arranged for determining that an interference to the first electronic sensing device is caused by the electronic sensing device, if the signal feature profile matches the stored feature profile.

The electronic sensing device operates according to the method as disclosed in the first aspect of the present disclosure, to process the interference experienced by the first electronic sensing device.

Various steps performed by the electronic sensing device may be considered as being performed by respective functional modules of the processor of the electronic sensing device.

In an example of the present disclosure, the signal feature profile is obtained by the first electronic sensing device by applying a transformation algorithm to its received signal, in particular, the transformation algorithm is a Fast Fourier Transform, FFT, algorithm, from which a number of consecutive FFT frames having peak energy higher than a threshold value are obtained, each FFT frame comprising a plurality of frequency components having an energy.

In an example of the present disclosure, the signal feature profile comprises the number of consecutive FFT frames having peak energy higher than a threshold value, the message further comprises a duration of the signal feature profile, the predetermined time period is longer than the duration of the signal feature profile, the matching module is arranged for:

retrieving the number of consecutive FFT frames of the signal feature profile from the message, forming a further profile comprising a number of frequencies each identified as a frequency component having peak energy among the frequency components of a respective FFT frame of the signal feature profile, and comparing the frequencies having peak energy with corresponding frequencies of a set of FFT frames of the stored feature profile obtained within the predetermined time period before receiving the signal feature profile via a sliding window algorithm.

In an alternative example of the present disclosure, the signal feature comprises a number of frequencies each identified as a frequency component having peak energy among the frequency components of a respective one of the number of consecutive FFT frames, the message further comprises a duration of the signal feature profile, the predetermined time period is longer than the duration of the signal feature profile, the matching module is arranged for:

retrieving the signal feature profile comprising the number of frequencies from the message, and comparing the frequencies having peak energy with corresponding frequencies of a set of FFT frames of the stored feature profile obtained within the predetermined time period before receiving the signal feature profile via a sliding window algorithm.

In an example of the present disclosure, the signal feature profile matches the stored feature profile when a qualifying number of frequencies having peak energy and corresponding frequencies of the set of FFT frames of the stored feature profile are identical to each other.

In an example of the present disclosure, the processor further comprises an adjusting module arranged for adjusting an operating frequency of the electronic sensing device by a preset offset frequency such that the interference to the first electronic sensing device is eliminated.

When an interference or a cross-talk is present between such a sensing device and the first electronic sensing device, the interference can be effectively eliminated according to the present disclosure.

The above method and electronic sensing devices may be used in a system for processing an interference detected by a first electronic sensing device, the system comprising the first electronic sensing device and a second electronic sensing device operating in accordance with the method according to the first aspect of the present disclosure.

In a third aspect of the present disclosure there is provided a computer program product, comprising a computer readable medium storing instructions which, when executed on at least one processor, cause the at least one processor to operate an electronic sensing device in accordance with the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to processing cross-talk between two microwave sensors for detecting a moving object. Such a microwave sensor typically comprises a radio frequency, RF, circuit comprising an oscillator for generating a high frequency signal, one or more antennas for transmitting the oscillating signal and receiving a signal from the moving object, and a mixer for modulating the oscillating signal with the received signal. A signal obtained by modulating the oscillating signal with the received signal is referred to as an intermediate frequency, IF, signal. As described in the background, the cross-talk between two microwave sensors is present or detected by a microwave sensor in its IF output signal.

It will be understood by those skilled in the art that the present disclosure is not limited to processing cross-talk or interference between microwave sensors only. Instead, the present disclosure can be applied to a wide variety of electronic sensing devices experiencing interference between each other, as a result of a transmission by one electronic sensing device being undesirably picked up and processed by the other electronic sensing device. The method of the present disclosure can be effectively used to process and eliminate such interference as well.

Figure 1:
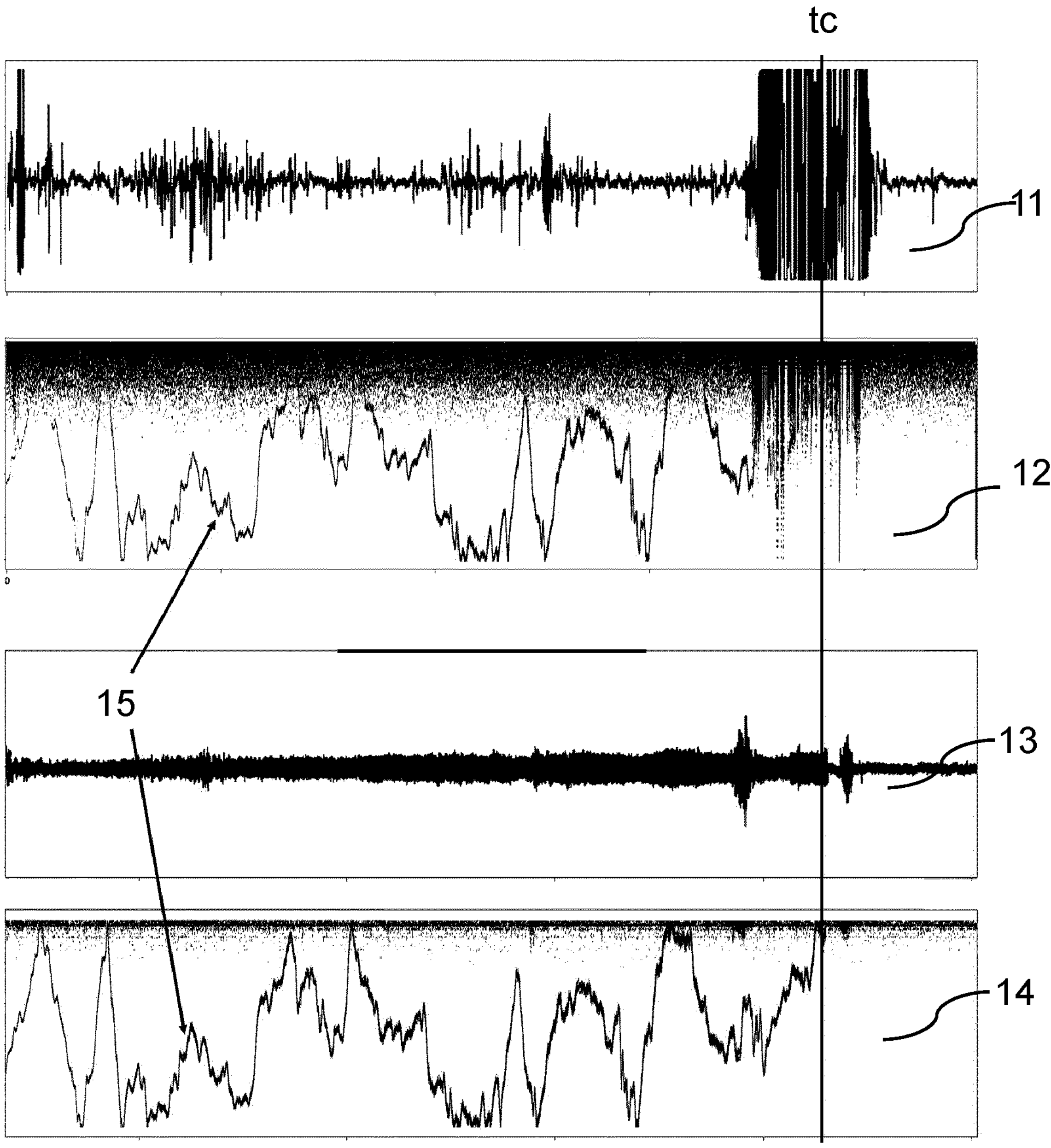
FIG. 1 are graphs illustrating interference or cross-talk present in received signals of two microwave sensors placed in adjacent to each other.

FIG. 1 are graphs illustrating interference or cross-talk present in received signals of two microwave sensors placed in adjacent to each other, for example distanced by two meters. The received signals here are represented as a part of IF output signals from each microwave sensor, in both time and frequency domains.

In FIG. 1, a graph 11 is an IF output signal from a first microwave sensor, a graph 12 is the Fast Fourier Transform, FFT, result of the signal shown in the graph 11. Similarly, a graph 13 illustrates an IF output signal from a second microwave sensor, and a graph 14 is the FFT result of the signal shown in the graph 13.

A snake-shaped dynamic curve 15 present in both FFT results 12 and 14 represents frequency components of a cross-talk between the two microwave sensors, which illustrates the changing of a difference between operating frequencies of the two sensors.

At time tc indicated in FIG. 1, the operating frequency of one of the microwave sensors is shifted by several hundred kilohertz, KHz. It is seen from the graphs that the cross-talk vanishes from the FFT results of the output signals of both microwave sensors. The cross-talk therefore also vanishes from the interested frequency range of the sensors, after such adjustment of the operating frequency of one of the microwave sensors, which is normally a range of 1 to 500 Hz for most applications.

The inventors, after theoretical and experimental study of the cross-talk between the microwave sensors as described above with reference to FIG. 1, arrive at the following finding regarding the cross-talk:

- The cross-talk between two microwave sensors shares similar frequency patterns in time sequence, both of which representing the changing of a difference Δf between the operating frequencies of the two microwave sensors.
- The severity of cross-talk varies from piece to piece.
- By changing the carrier frequency and thereby the operating frequency of one sensor, the cross-talk for both microwave sensors can be successfully eliminated from the interested frequency range.

The above finding is used advantageously in the present invention for identifying or determining a source of interference or cross-talk experienced by one electronic sensing device, such as a microwave motion sensor, and then for correcting or eliminating the influence from the cross-talk to both electronic sensing devices.

In the following, a method of processing the cross-talk between microwave sensors in accordance with the present disclosure will be described in detail. The inventive method makes use of feature-extraction to identify a suspected cross-talk and to confirm it via an inter-device cross-check.

Figure 2:
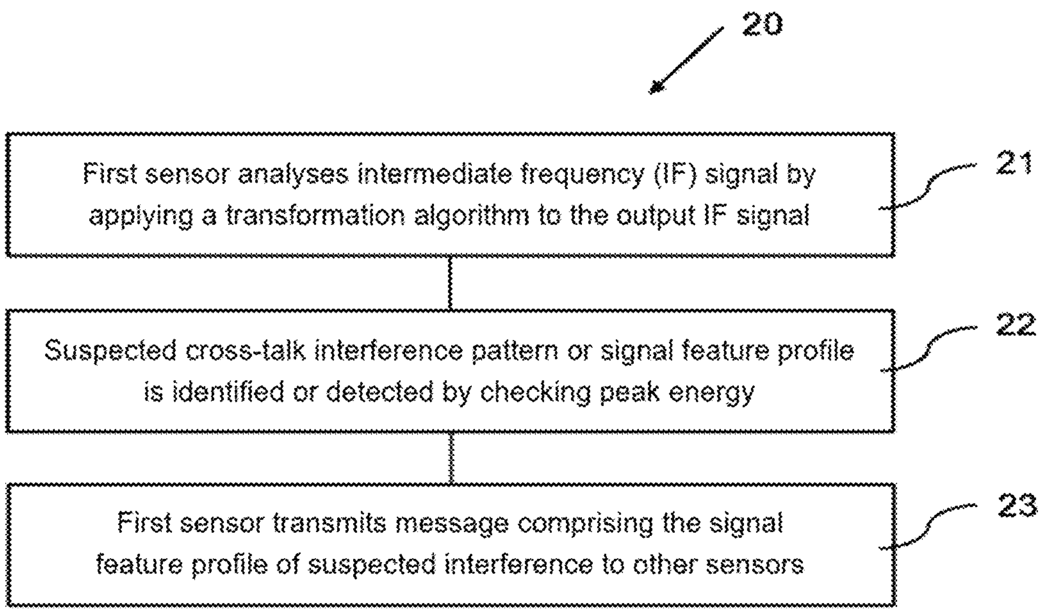
FIG. 2 illustrates, in a simplified flow diagram, steps of a method performed by an electronic sensing device for detecting a suspected cross-talk from another electronic sensing device in accordance with an embodiment of the present disclosure.

FIG. 2 illustrates, in a simplified flow diagram, steps of a method 20 performed by an electronic sensing device for detecting a suspected cross-talk from a further electronic sensing device, in accordance with an embodiment of the present disclosure.

The electronic sensing device, in this example a microwave sensor referred to as sensor A, starts to work by transmitting an oscillating signal having a carrier frequency and receiving signals generated in response to detection of a moving object or interference from other electronic sensing devices operating in the neighborhood of the microwave sensor. The received signal is mixed with the oscillating signal to generate an output IF signal.

At step 21, the sensor A first analyses the IF signal by applying a transformation algorithm to the output IF signal. The transformation algorithm may be for example a Fast Fourier Transform, FFT, algorithm. It can also be other transformation algorithm such as Z transform or wavelet transform, depending on property of the signals being analyzed and the expected analysis result.

When FFT is applied, the IF signal in the time domain is sampled based on a sample rate to obtain a number of data samples. A number of data samples during a certain time period may be transformed using FFT into a FFT frame in the frequency domain.

In one example, a sampling rate of 1 KHz is used to sample the IF signal output by the microwave sensor A, and a max FFT range is assumed to be 500 Hz. Moreover, a cycle-time for each FFT is 0.1 second, which means that one FFT is done every 0.1 second. When a 256-point FFT is used, a FFT is performed on 256 data samples every 0.1 second to obtain 256 frequency components distributed in the FFT frequency range.

As an example, a processor of the sensor A may do a routine FFT and store FFT results obtained during a certain period, for example 5 seconds, in a first part of a storage device, such as a data buffer, of or connected to the sensor A. The data buffer may be for example a Random Access Memory, RAM, of a microcontroller unit, MCU, functioning as the processor of the sensor or an external flash memory.

The FFT result stored in the first part of the storage device comprises all FFT frames obtained over time, and may be plotted as a graph 12 or 14 in FIG. 1, by plotting each FFT frame obtained at a time point sequentially in a time series.

It is noted that the processing involved in step 21 is performed by any electronic sensing device operating according to the present disclosure, which provides a basis for inter-device cross-check of a suspected interference or cross-talk detected by one of the electronic sensing devices other than the sensor A.

At step 22, a suspected cross-talk pattern or simply a signal feature profile is identified or detected by checking peak energy, for a series of FFT frames, within a frequency range, such as between [½ max FFT range, max FFT range] and comparing the peak energy of each FFT frame with a threshold value.

For calculation of the energy of the FFT frames, FFT graying is first performed on the FFT result obtained in step 22.

The peak energy of a FFT frame in its frequency range is energy of or related to a frequency having a highest or peak energy of all frequency components in the FFT frame. In the example of step 22, the peak energy within [250 Hz, 500 Hz] will be checked to find the peak energy of each FFT frame.

If the peak energy of each and every FFT frame of a sequence of consecutive FFT frames is constantly larger or higher than the threshold value, that is for a certain period, the grayed FFT result from this period will be marked or identified as a complete cross-talk feature.

In one example, the minimal period required for identifying a cross-talk is about two seconds. In the example where a FFT is done every 0.1 s, twenty FFT frames will be obtained within two seconds. Therefore, when all of the twenty FFT frames obtained during a period of two seconds have FFT peak energy higher than the threshold value, the suspected cross-talk feature is considered to be detected.

The above is implemented via the following processing flow. The peak energy within the frequency range of each FFT frame is compared with the threshold value. When the peak energy of a FFT frame is higher than the threshold value, the FFT frame is stored in a second part of the storage device, together with the frequency having the peak energy, and a counter for counting a number of FFT frames with peak energy higher than the threshold value is increased by one. The counter goes back to zero when the peak energy of a subsequent FFT frame falls below the threshold value, which means the counting will restart again once a FFT frame having peak energy lower than the threshold value is detected.

When the counter for counting FFT frames with peak energy higher than the threshold value reaches 20, it is indicated that a sequence of consecutive or continuous 20 FFT frames all have peak energy higher than the threshold value. In this case, it is decided that a cross-talk is detected or identified. The FFT fames are all stored in the second part of the storage device, together with respective frequencies with peak energy of each FFT frame.

It can be understood that other durations for identifying a suspected cross-talk may be used, such as 1 second or 3 seconds. Also, the FFT cycle-time may be varied, such as doing one FFT every 0.05 second or every 0.2 second. Therefore, the number of FFT frames needed for identifying a suspected cross-talk will vary accordingly.

It is noted that when finding the peak energy and the related frequency of a FFT frame, hum noise caused by line or mains frequency, which is normally 50 Hz or 60 Hz, is eliminated first such that more accurate peak energy and a corresponding frequency may be found.

Based on the consecutive FFT frames having peak energy higher than the threshold value, a signal feature profile representing a suspected interference or cross-talk can be formed.

The signal feature profile may comprise all the identified FFT frames, with all frequency components of each FFT frame. Alternatively, the signal feature profile may comprise only the frequencies with peak energy of each FFT frame. In this case, the signal feature profile is a pattern or waveform with the frequencies having the peak energy in each FFT frame plotted against the sequence of the FFT frames.

Figure 4A:
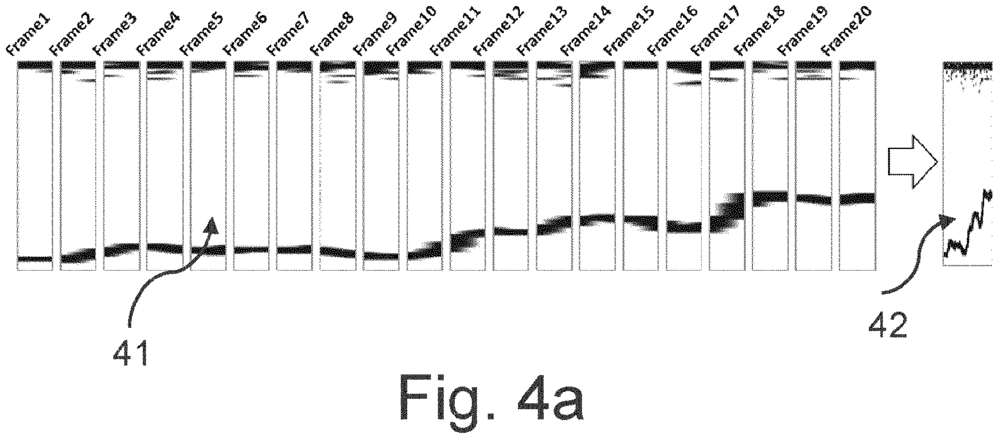
FIGS. 4*a* and 4*b* respectively illustrate a signal feature profile identifying a suspected interference and matching a received signal feature profile to a stored feature profile.

FIG. 4*a* schematically illustrates consecutive FFT frames used for forming a suspected cross-talk feature profile detected by a microwave sensor. The twenty FFT frames 41 each has a peak energy higher than the threshold value.

As an alternative, the profile as illustrated by graph 42 may also be used as the signal feature profile for representing the suspected cross talk, which comprises frequencies with the peak energy of each FFT frame plotted along the sequence of the FFT frames.

Once the suspected cross-talk is identified via the analysis at step 22, the sensor A will, at step 23, transmit a message comprising the signal feature profile to other sensors using for example wireless communication.

Figure 4B:
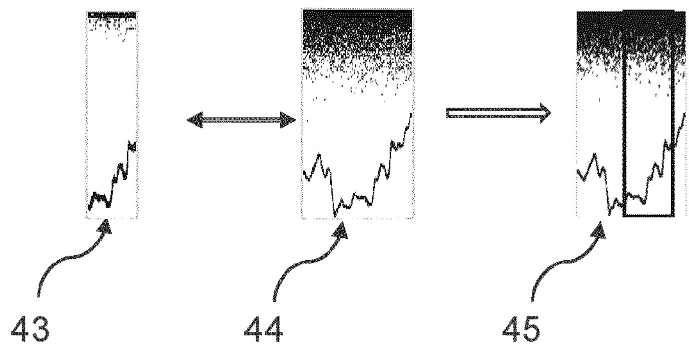

The signal feature profile may comprise all identified consecutive FFT frames, with all detailed information about the suspected cross-talk features that it captured in the past two second, such as the profile 41 of FIG. 4.

In this case, the identified FFT frames representing the feature of the cross-talk detected by the microwave sensor A are encoded as for example a RF message, with an exemplary format of [DeviceID, duration, FFT frame1, FFT frame2, . . . , FFT frame N], where DeviceID is an identification of the microwave sensor A detecting the suspected cross talk.

It is noted that the parameter duration relates to a number N or a time period of FFT frames, where the number of FFT frames is equal to the required time period for identifying a cross talk divided by a FFT cycle-time in second. In the example as describe herein, N=2 second/0.1 second=20. Therefore, the duration may be the number 20 or the time period of 2 second, of the consecutive FFT frames.

Thus, the RF message which contains the suspected cross-talk feature is in the format of [DeviceID, 20 frames/2 seconds, FFT frame1, FFT frame2, . . . , FFT frame20], each FFT frame is constructed by a 128 byte data array, comprising 128 frequency components with corresponding energy at each frequency. As a result, a total size of the RF message is about 20*128 byte with all 20 frames of the FFT result arranged in a series.

On the other hand, when the signal feature profile representing the suspected interference comprises only frequencies with peak energy of the consecutive FFT frames, it has a format of [DeviceID, 20 frames/2 seconds, frequency 1, frequency 2, . . . , frequency 20]. In this case, the RF message is reduced significantly, which is advantageous for applications with limited communication resources for exchanging data between devices.

This RF message may be broadcasted to nearby microwave sensors via RF communication known to those skilled in the art.

Figure 3:
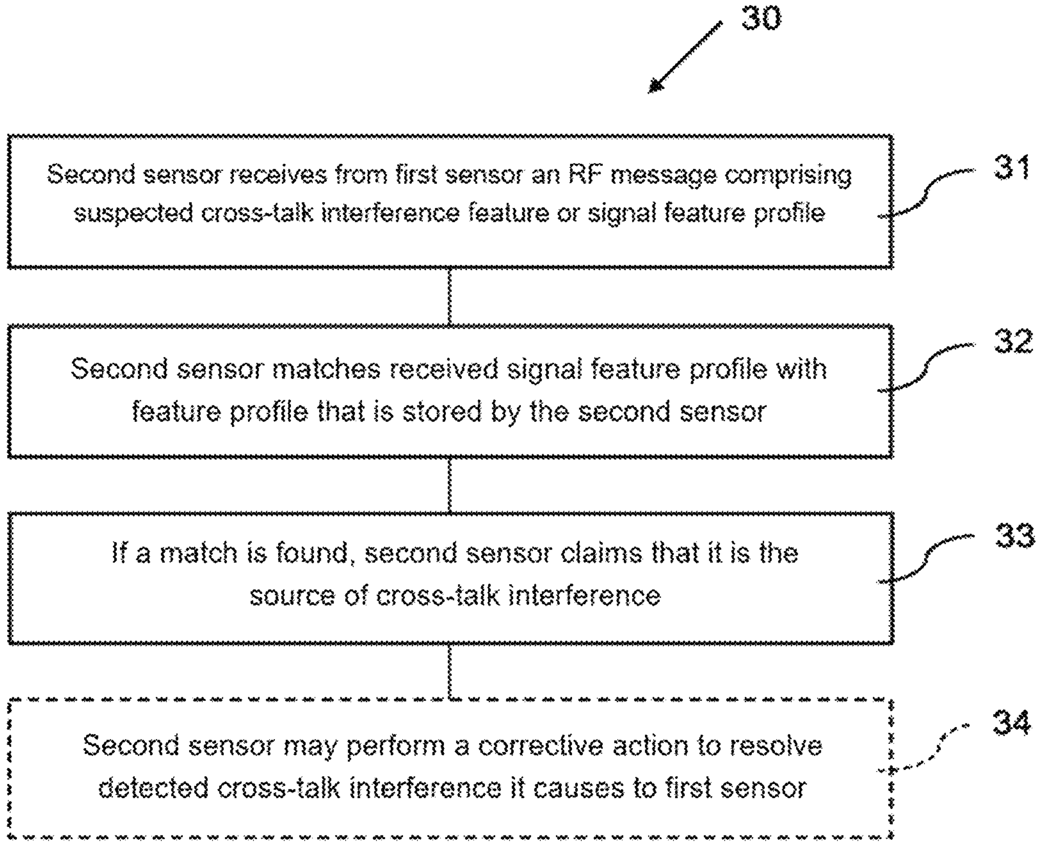
FIG. 3 illustrates, in a simplified flow diagram, steps of a method performed by a second electronic sensing devices for processing a suspected interference or cross-talk to another electronic device as detected in FIG. 2, in accordance with an embodiment of the present disclosure.

FIG. 3 illustrates, in a simplified flow diagram, steps of a method for processing the suspected cross-talk feature profile received from the sensor A. A second electronic sensing devices receiving the broadcasted RF message, such as other microwave sensors, may process the received suspected interference or cross-talk detected by the sensor A in accordance with a method as illustrated in FIG. 3.

It is noted that other electronic sensing devices such as another microwave sensor, in operation, also analyze its IF signal by applying a transformation algorithm, such as FFT, and have all FFT frames, and frequencies with peak energy in each FFT frames, forming a feature profile obtained overtime saved in its storage device or a storage device connected thereto.

At step 31, the second electronic sensing device, such as a microwave sensor B different than the microwave sensor A detecting the suspected cross-talk, receives from the sensor A, the RF message comprising the suspected cross-talk feature or the signal feature profile.

At step 32, the microwave sensor B matches the received signal feature profile with a feature profile that is stored by the microwave sensor B. The matching is performed to confirm that the feature profile stored by the microwave sensor B matches the cross-talk feature profile received from the microwave sensor A. It is noted that frequencies with peak energy are stored for respective FFT frames of the stored feature profiles as well.

Depending the details of the signal feature profile received from the microwave sensor A, the comparison may be performed in different ways.

Upon receiving the RF message comprising the signal feature profile, the sensor B first decodes the RF message which maybe in a format of [DeviceID, time, FFT frame1, FFT frame2, . . . , FFT frame20] into a grayed FFT feature, comprising the set of consecutive FFT frames representing the signal feature profile.

The microwave sensor B then further processes the retrieved FFT frames of the signal feature profile received from the microwave sensor A to extract frequencies with peak energy from all the FFT frames, and compare the extracted frequencies with frequencies of corresponding FFT frames of the stored feature profile.

A similar comparison is performed when the signal feature profile received from the microwave sensor comprises the frequencies with peak energy from all the consecutive FFT frames identified to represent the suspected interference.

In both cases, a match may be decided when a qualifying number of frequencies of the signal feature profile and the stored feature profile are identical to each other.

As an example, when 20 frequencies of 20 FFT frames are comprised in the signal feature profile, a match may be determined when 19 of the 20 frequencies in the signal feature profile and the stored feature profile are identical.

It can be contemplated by those skilled in the art that the qualifying number for determining match may be varied based on application dependent requirements, such as accuracy of interference reporting, available resources of the electronic sensing devices and so on.

An exemplary criterion may be that 95%, 90%, 85% or 80% of the frequencies forming the signal feature profile and the stored feature profile are identical. Another criterion may be that 95%, 90%, 85% or 80% of frequency components of the signal feature profile and that of the store feature profile are identical.

The comparison is performed between the received signal feature (further) profile obtained within a certain time period with saved FFT frames obtained in a period before and longer than the time period of the received cross-talk feature profile. This is in consideration of delay introduced by processing and transmitting the received FFT frames.

The comparison is therefore done by a window sliding algorithm, which allows a match to be determined.

FIG. **4*b* illustrates a comparison performed for matching a received signal feature profile 43 and a stored feature profile 44, both feature profiles comprise frequencies with peak energy with the FFT frames obtained by the first and second microwave sensors. A match is decided as the comparison identifying 45** the signal feature profile in the stored feature profile.

If a match with the received FFT frames is found at step 32, the sensor B will, at step 33, claim that it is the source of the cross-talk. If no match is confirmed, the message will simply be discarded by the sensor B without taking any action.

Thereafter, at step 34, the microwave sensor B, may perform a corrective action to resolve the detected cross-talk it causes to the microwave sensor A. As an example, it may shift its operating frequency by hundreds of Khz, which will eliminate the cross-talk interference for both sensor A and sensor B simultaneously.

The corrective action to solve the cross-talk may be one or more of the following options:

The microwave sensor claiming or identifying itself as the source of the cross-talk shifts its operating frequency by a preset value and thus eliminates the cross-talk automatically.

The microwave sensor claiming or identifying itself as the source of the cross-talk broadcasts a message to a central controller, which can take actions centrally from the backend to correct the cross-talk by for example shifting the operating frequency of one of the sensors.

The microwave sensor claiming or identifying itself as the source of the cross-talk broadcasts a message directly to an end-user, who can remotely reconfigure the sensors' operating frequency settings to eliminate the cross-talk manually.

In practice, there is in maximum one sensor, such as sensor B, confirming a match with this cross-talk feature and claiming the interference to be originated from itself. Any other sensor receiving the RF signal but confirms no match will just ignore the broadcast message from the sensor A without taking any action or implementing any change.

There is a chance that the suspected cross-talk feature actually comes from the real motion signal, in this case no sensor will confirm a match with this cross-talk, that is, the cross-talk interference will not be claimed. The receiving sensors just ignore the message broadcasted by the sensor A with no change implemented.

If there are more than two pairs of sensors presenting cross-talk interference, the cross-talk interference would be handled one by one such that every time only interference between one pair of sensors would be detected and solved.

In practice, any one of a pair of microwave sensors experiencing interference between each other can initiate the processing as described above by transmitting an identified suspected interference or cross-talk feature profile. The other sensor will then receive the transmitted signal feature profile and try to match it to its stored feature profile and claim that the interference is caused by itself if a match is decided. In this sense, each sensor may perform the above described steps in the same way, either from the perspective of a transmitting sensor or from the perspective or a receiving sensor that claims interference.

Figure 5:
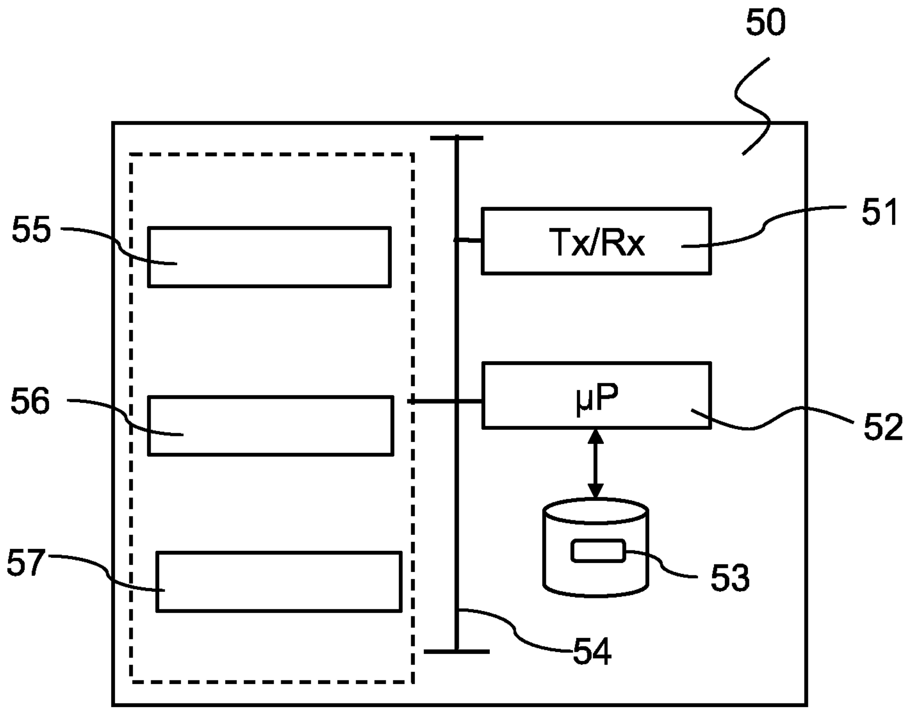
FIG. 5 schematically illustrates a diagram of an embodiment of an electronic sensing device arranged for processing an interference detected by a further electronic sensing device, in accordance with the present disclosure.

FIG. 5 schematically illustrates an electronic sensing device 50 arranged for performing the method described above.

It can be contemplated by those skilled in the art that in practice a sensor detecting the cross-talk is not differentiated from a sensor confirming or claiming and correcting the cross-talk. Either one of a pair of electronic sensing devices interfering each other may be the one transmitting the signal feature profile representing the detected suspected interference, while the other one will be the one processing and confirming that the interference originates from itself.

What matters is the mutual confirmation between the two electronic sensing devices, based on the property of the cross-talk detected by both the devices.

The electronic sensing device 50 may be a sensing device arranged for detecting or providing data in terms of motion or any other signal that may be detected and processed using the method of the present disclosure.

The electronic sensing device 50 comprises a communication interface such as a transceiver 51 or a network adapter arranged for wireless or wired exchange of messages or data packets with another electronic sensing devices in the network.

The electronic sensing device 50 further comprises at least one microprocessor, μP, or controller 52, and at least one data repository or storage or memory 53, among others for storing the feature profile obtained by analyzing signals that the electronic sensing device receives.

The at least one microprocessor or controller 52 communicatively interacts with and controls the communication interface 51, and the at least one repository or storage 53 via an internal data communication and control bus 54 of the second electronic sensing device 50.

The processor 51 may be considered as comprising different functional modules configured for performing the method of processing the interference that another electronic sensing device identifies or detects, in accordance with the present disclosure. The functional modules may comprise a matching module 55, a determination module 56 and an adjusting module 57, which are respectively configured for performing the corresponding steps described above.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of processing an interference detected by a first microwave sensor, the method comprising the steps of:

receiving, by a second microwave sensor, from the first microwave sensor a message comprising a signal feature profile representing a suspected interference detected by the first microwave sensor in its received signal;

matching, by the second microwave sensor, the signal feature profile comprised in the received message with a stored feature profile, the stored feature profile obtained by the second microwave sensor from its own received signal within a predetermined time period before receiving the signal feature profile, and determining, by the second microwave sensor, that an interference to the first microwave sensor is caused by the second microwave sensor when the signal feature profile matches the stored feature profile.

2. The method according to claim 1, wherein the signal feature profile is obtained by the first microwave sensor by applying a transformation algorithm to its received signal, in particular, the transformation algorithm is a Fast Fourier Transform, FFT, algorithm, from which a number of consecutive FFT frames having peak energy higher than a threshold value are obtained, each FFT frame comprising a plurality of frequency components each having an energy.

3. The method according to claim 2, wherein the signal feature profile comprises the number of consecutive FFT frames having peak energy higher than a threshold value, the message further comprises a duration of the signal feature profile, the predetermined time period is longer than the duration of the signal feature profile, and the step of matching comprises the steps of:

retrieving, by the second microwave sensor, the number of consecutive FFT frames of the signal feature profile from the message, forming, by the second microwave sensor, a further profile comprising a number of frequencies each identified as a frequency component having peak energy among the frequency components of a respective FFT frame of the signal feature profile, and comparing, by the second microwave sensor, the frequencies having peak energy with corresponding frequencies of a set of FFT frames of the stored feature profile obtained within the predetermined time period before receiving the signal feature profile via a sliding window algorithm.

4. The method according to claim 2, wherein the signal feature comprises a number of frequencies each identified as a frequency component having peak energy among the frequency components of a respective one of the number of consecutive FFT frames, the message further comprises a duration of the signal feature profile, the predetermined time period is longer than the duration of the signal feature profile, and the step of matching comprises the steps of:

retrieving, by the second microwave sensor, the signal feature profile comprising the number of frequencies from the message, and comparing, by the second microwave sensor, the frequencies having peak energy with corresponding frequencies of a set of FFT frames of the stored feature profile obtained within the predetermined time period before receiving the signal feature profile via a sliding window algorithm.

5. The method according to claim 3, wherein the signal feature profile matches the stored feature profile when a qualifying number of frequencies having peak energy and corresponding frequencies of the set of FFT frames of the stored feature profile are identical to each other.

6. The method according to claim 1, further comprising the step of:

adjusting, by the second microwave sensor, its operating frequency by a preset offset frequency such that the interference to the first microwave sensor is eliminated.

7. The method according to claim 6, wherein the adjusting is performed by the second microwave sensor under control of at least one of the second microwave sensor itself, a central control device and an operator.

8. The method according to claim 1, wherein the first and second microwave sensors comprise microwave sensors.

9. A microwave sensor for processing an interference detected by a first microwave sensor, the microwave sensor comprising:

a transceiver being configured to receive, from a first microwave sensor, a message comprising a signal feature profile representing a suspected interference detected by the first microwave sensor in a received signal of the first microwave sensor, and a processor comprising:

a matching module arranged for matching the signal feature profile comprised in the received message with a stored feature profile, the stored feature profile obtained by the microwave sensor from the received signal of the microwave sensor within a predetermined time period before receiving the signal feature profile, and a determination module arranged for determining that the interference to the first microwave sensor is caused by the microwave sensor when the signal feature profile matches the stored feature profile.

10. The microwave sensor according to claim 9, wherein the signal feature profile is obtained by the first microwave sensor by applying a transformation algorithm to its received signal, in particular, the transformation algorithm is a Fast Fourier Transform, FFT, algorithm, from which a number of consecutive FFT frames having peak energy higher than a threshold value are obtained, each FFT frame comprising a plurality of frequency components each having an energy.

11. The microwave sensor according to claim 10, wherein the signal feature profile comprises the number of consecutive FFT frames having peak energy higher than a threshold value, the message further comprises a duration of the signal feature profile, the predetermined time period is longer than the duration of the signal feature profile, the matching module is arranged for:

retrieving the number of consecutive FFT frames of the signal feature profile from the message, forming a further profile comprising a number of frequencies each identified as a frequency component having peak energy among the frequency components of a respective FFT frame of the signal feature profile, and comparing the frequencies having peak energy with corresponding frequencies of a set of FFT frames of the stored feature profile obtained within the predetermined time period before receiving the signal feature profile via a sliding window algorithm.

12. The microwave sensor according to claim 10, wherein the signal feature comprises a number of frequencies each identified as a frequency component having peak energy among the frequency components of a respective one of the number of consecutive FFT frames, the message further comprises a duration of the signal feature profile, the predetermined time period is longer than the duration of the signal feature profile, the matching module is arranged for:

retrieving the signal feature profile comprising the number of frequencies from the message, and comparing the frequencies having peak energy with corresponding frequencies of a set of FFT frames of the stored feature profile obtained within the predetermined time period before receiving the signal feature profile via a sliding window algorithm.

13. The microwave sensor according to claim 11, wherein the signal feature profile matches the stored feature profile when a qualifying number of frequencies having peak energy and corresponding frequencies of the set of FFT frames of the stored feature profile are identical to each other.

14. The microwave sensor according to claim 9, wherein the processor further comprises an adjusting module arranged for adjusting an operating frequency of the microwave sensor by a preset offset frequency such that the interference to the first microwave sensor is eliminated.

15. A non-transitory computer program code to perform the method of claim 1 when run on a processor.

* * * * *